(12) United States Patent
Renius et al.

(10) Patent No.: US 8,382,211 B2
(45) Date of Patent: Feb. 26, 2013

(54) WHEEL INSERT ATTACHMENT SYSTEM

(75) Inventors: Paul W. Renius, Metamora, MI (US);
Mark A. Voss, Richmond, MI (US);
Derek L. Patterson, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 313 days.

(21) Appl. No.: 12/836,649

(22) Filed: Jul. 15, 2010

(65) Prior Publication Data

US 2012/0013170 A1  Jan. 19, 2012

(51) Int. Cl.
*B60B 7/06* (2006.01)
(52) U.S. Cl. .............................. 301/37.102; 301/37.106
(58) Field of Classification Search ............. 301/37.101, 301/37.28, 37.102, 37.106, 37.108, 37.109; D12/211; 40/587
See application file for complete search history.

(56) References Cited

U.S. PATENT DOCUMENTS

| | | | | |
|---|---|---|---|---|
| 3,172,704 A | * | 3/1965 | Wise | 301/37.26 |
| 3,361,483 A | * | 1/1968 | Main et al. | 301/37.42 |
| 3,894,775 A | * | 7/1975 | Christoph et al. | 301/37.35 |
| 5,441,334 A | * | 8/1995 | Botterman et al. | 301/37.11 |
| 6,439,670 B1 | * | 8/2002 | Winters | 301/37.101 |
| 6,517,168 B1 | * | 2/2003 | Van Houten | 301/37.42 |
| 6,669,305 B2 | * | 12/2003 | Ichikawa | 301/37.28 |
| 7,246,860 B1 | * | 7/2007 | Seitz | 301/37.28 |
| 7,314,255 B2 | * | 1/2008 | Wang | 301/37.33 |
| 7,452,037 B1 | * | 11/2008 | Nunes | 301/37.31 |
| 7,510,248 B2 | * | 3/2009 | Wang | 301/37.33 |
| 7,841,670 B2 | * | 11/2010 | Takeda et al. | 301/37.102 |
| 8,020,945 B2 | * | 9/2011 | Takeda et al. | 301/37.371 |
| 8,201,894 B2 | * | 6/2012 | Chinavare et al. | 301/37.28 |
| 2003/0155804 A1 | * | 8/2003 | Weckman et al. | 301/37.28 |
| 2004/0195905 A1 | * | 10/2004 | French et al. | 301/37.28 |
| 2010/0181821 A1 | * | 7/2010 | Noriega | 301/5.1 |
| 2010/0231029 A1 | * | 9/2010 | Russell | 301/37.31 |
| 2011/0291465 A1 | * | 12/2011 | Peschiutta et al. | 301/37.102 |

FOREIGN PATENT DOCUMENTS

| | | | | |
|---|---|---|---|---|
| JP | 11208203 A | * | 8/1999 | |
| JP | 2001071704 A | * | 3/2001 | |

OTHER PUBLICATIONS

Prior Art Wheel Inserts, on the market by various manufacturers since at least Jun. 6, 2009, 2 pages.

* cited by examiner

*Primary Examiner* — Kip T Kotter

(57) ABSTRACT

An ornamental wheel insert utilizing a snap-fit attachment to a wheel. In a first embodiment, fingers carrying bosses are attached to an insert body, wherein when the insert body is seated the bosses snappingly engage a boss abutment of the wheel. In a second embodiment, a snap ring snappingly engages the insert body from the inside of the wheel to thereby securely seat the insert body at the wheel.

2 Claims, 4 Drawing Sheets

WHEEL INSERT ATTACHMENT SYSTEM

TECHNICAL FIELD

The present invention relates to motor vehicle wheels, and more particularly to a snap-fit attachment system for ornamental wheel inserts.

BACKGROUND OF THE INVENTION

Automotive wheels have become not only a functional component of the motor vehicle, but a fashionable one, as well. Wheels frequently are provided with decorative shapes and configurations between the tire rim and the hub. A common style theme nowadays is a plurality of widely spaced apart elongated spokes emanating radially from the hub and intersecting the rim. For example, in a five lug nut hub, an efficient wheel design (from a structural standpoint) is to have five elongated spokes, however, the number of spokes may be otherwise. While such styles provide dramatically impressive wheels, functionality pertains as well, in that the brakes disposed at the inner (axle hub facing) side of the wheel are provided with copious ventilation via the generous spacing between the spokes.

As the importance of wheel appearance has increased, so has the desire to customize wheels so that the motor vehicle appearance is even further enhanced. One of the enhancements available in the prior art pertains to ornamental wheel inserts which fit into predetermined seats of the wheel, as for example between or at the spokes. These ornamental wheel inserts are secured by either two-sided tape, as for example available through 3M Company of St. Paul, Minn. 55144, or by threaded fasteners.

Problematically, the two-sided tape renders removal and replacement of the ornamental wheel insert quite difficult, and there is some chance the adhesive could untowardly fail. While threaded fasteners allow for easy removal and replacement, the need to have a drive head of the fasteners inhibits a fully clean appearance at the class A finish side of the ornamental wheel insert, while further requiring the provision for tapped holes in the wheel, itself.

Accordingly, what remains needed in the art is an ornamental wheel insert which does not rely upon adhesive or threaded fasteners for its primary attachment to the wheel.

SUMMARY OF THE INVENTION

The present invention is an ornamental wheel insert which utilizes a snap-fit attachment modality and does not rely upon adhesive or threaded fasteners for its primary attachment to the wheel.

Each snap-fit ornamental wheel insert according to the present invention has an insert body having a predetermined shape which is complementary to the shape of a corresponding insert seat at the outside (class A finish side) of the wheel so that the insert body seats at the insert seat. Additionally, each snap-fit ornamental wheel insert has an outer (class A finish) side which is visible to an onlooker when seated in its insert seat and also has an inner side opposite the outer side, which may have either a class A or Class B finish depending upon its visibility to an onlooker. The insert body has a snap-fit engagement system connected therewith which provides snapping retention of the insert body to the insert seat.

In a first preferred embodiment of the snap-fit ornamental wheel insert according to the present invention, each snap-fit ornamental wheel insert is composed of a single piece construction. At the inner side of the insert body the snap fit engagement system includes at least one pair of mutually opposed and upstanding fingers, each carrying a boss. Each insert seat of the wheel is configured so that when the insert body is seated at the insert seat, each of the bosses snap-fit engages with a respective boss abutment of the wheel so as to thereby interferingly retain the insert body seated in its insert seat of the wheel.

In a second preferred embodiment of the snap-fit ornamental wheel insert according to the present invention, each snap-fit ornamental wheel insert is composed of multiple piece construction in the form of an insert body and a complementary snap ring, each being mutually snap-fitting with respect to the other. The insert body has an outer (class A finish) side and carries a plurality of snap-fit engagement members. The snap ring is configured to snap-fit engage the plurality of snap-fit engagement members of the insert body. In operation, each insert body is located in its respective insert seat at the outside of the wheel, wherein the outer side of the insert body is exposed to view. Then, from the inside (class B finish side) of the wheel, the snap ring is interfaced with the insert body such that each snap-fit engagement member snaps lockingly onto the snap ring so as to thereby interferingly retain the insert body at its respective insert seat.

In each of the first and second embodiments of the snap-fit ornamental wheel insert, two-sided tape may be used as a supplemental retention feature which serves in addition to the snap-fit engagement which remains the primary attachment modality.

Accordingly, it is an object of the present invention to provide an ornamental wheel insert which utilizes a snap-fit attachment modality, and does not rely upon adhesive or threaded fasteners for its primary attachment to the wheel.

This and additional objects, features and advantages of the present invention will become clearer from the following specification of a preferred embodiment.

DESCRIPTION OF THE PREFERRED EMBODIMENT

Figure 1:
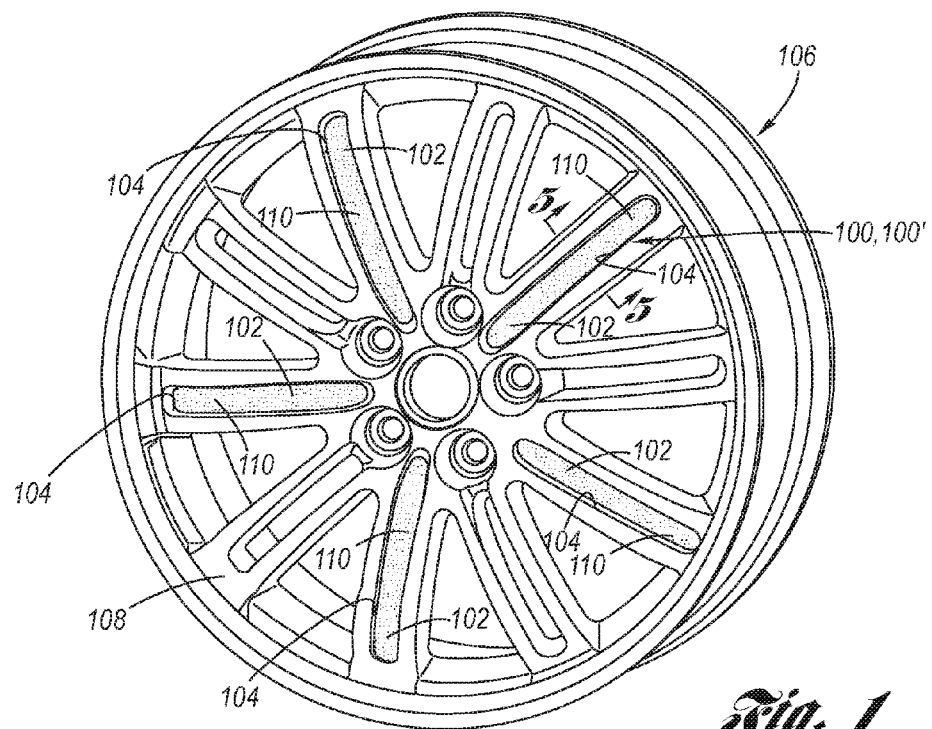
FIG. 1 is a front perspective view of an automotive wheel including a plurality of snap-fit ornamental wheel inserts according to a first embodiment of the present invention.

Referring now to the Drawing, FIGS. 1 through 14 depict examples of the snap-fit ornamental wheel insert 100 according to the present invention in which a snap-fit provides an interfering attachment modality with respect to an automotive wheel. In this regard, typical wheel styling queues tend to add weight, limit strength, and increase the cost of production. As such, the placement of the snap-fit ornamental wheel insert 100 upon a wheel provides the advantage of adding styling queues to the wheel without the aforesaid disadvantages, even providing intricate and dramatic designs, colors, and finishes. In addition, an end user is enabled to customize his/her vehicle wheels at any time. But, the advantages of the present invention are not limited to visual presentation, having the added advantage of providing functional enhancement, as for example by reducing aerodynamic drag of the wheels.

Turning attention firstly to FIGS. 1 through 7, depicted is a first embodiment of the snap-fit ornamental wheel insert 100, 100' according to the present invention which is of a single piece construction. Each snap-fit ornamental wheel insert 100' according to the present invention has an insert body 102 having predetermined shape which is complementary to the shape of a corresponding insert seat 104 formed at the outside (class A finish side) 108 of the wheel 106 such that the insert body locatably and securely seats at the insert seat via abutment with the seat surfaces 104' (see FIG. 5). The insert seat 104 may be configured specifically for receiving the insert body 102 (as for example shown at FIGS. 3 through 5), or may be an artifact of the configuration of the wheel which is suitable in shape for locating a complementarily shaped insert body (as for example shown at FIG. 9), and may be disposed at a spoke (as shown), between spokes or independent of any spokes (whether or not present). Each insert body 102 has an outer (class A finish) side 110 which is visible to an onlooker when seated in its respective insert seat 104 and an inner (class A or class B finish) side 112 opposite the outer side, wherein selection of class A or class B depends on whether or not it is visible to an onlooker of the outside of the wheel when the insert body is seated in its respective insert seat.

Figure 2:
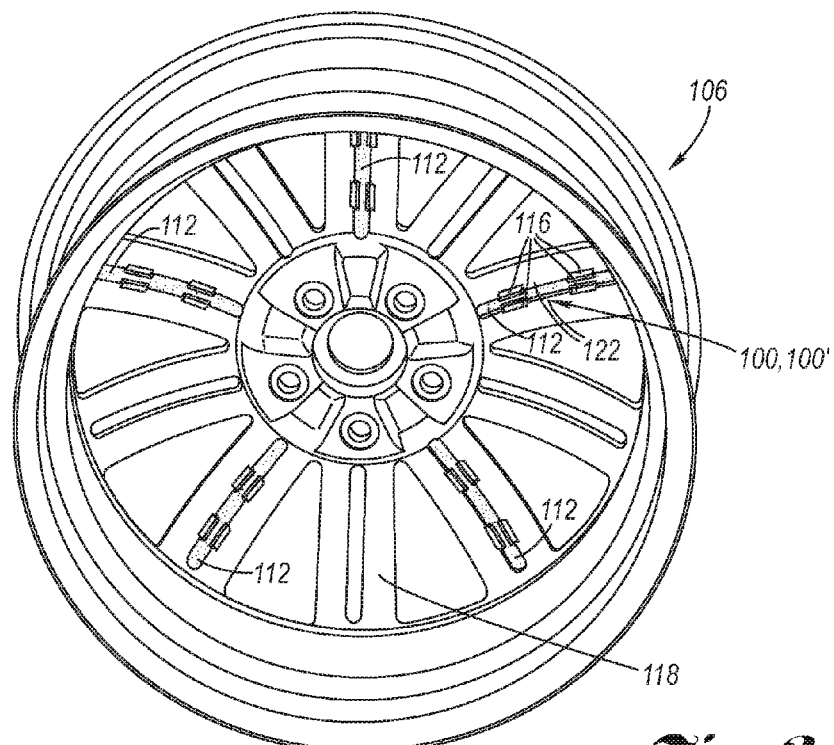
FIG. 2 is a rear perspective view of the automotive wheel of FIG. 1, showing insert bosses of the snap-fit ornamental wheel inserts engaging boss abutments of the wheel according to the first embodiment of the present invention.

At the inner side 112 of the insert body 102 is connected thereto at least one pair of mutually opposed and upstanding fingers 114, two mutually spaced apart pairs of fingers being shown at FIG. 2. Each finger 114 carries a boss 116 projecting normal in relation thereto. Preferably the bosses 116 are of a general barb or wedge shape and include an entry ramp 120, as for example shown at FIG. 4; however, as for example shown at FIG. 7, the bosses 116' may be rounded with the entry ramp being an inherent feature of the rounding of the bosses, or be otherwise shaped. The insert seat 104 is configured so that when the insert body 102 is seated (located) thereat, each boss 116, 116' will be snap-fit engaged with a boss abutment 122, 122' of the wheel so as to interferingly retain the ornamental wheel insert 100' on the wheel with the insert body 102 securely seated in its respective insert seat 104.

Figure 3:
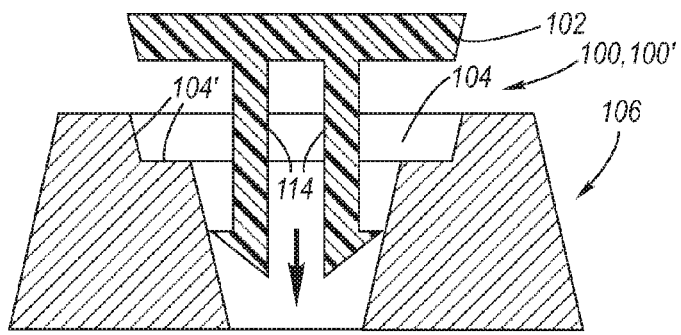
FIG. 3 is a sectional view of the insert seat of a wheel and the snap-fit ornamental wheel insert of FIGS. 1 and 2, shown in an initial stage of installation.
Figure 4:
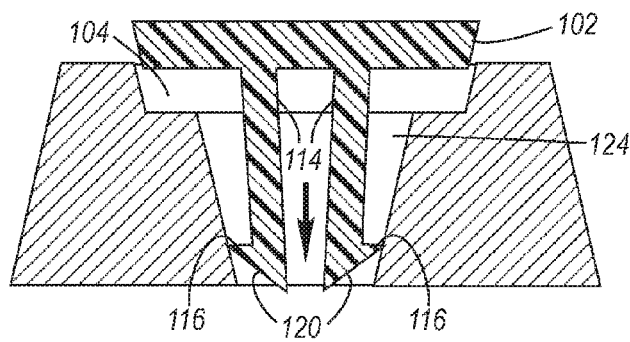
FIG. 4 is a sectional view of the insert seat of a wheel and the snap-fit ornamental wheel insert as in FIG. 3, now showing an intermediate stage of installation.
Figure 5:
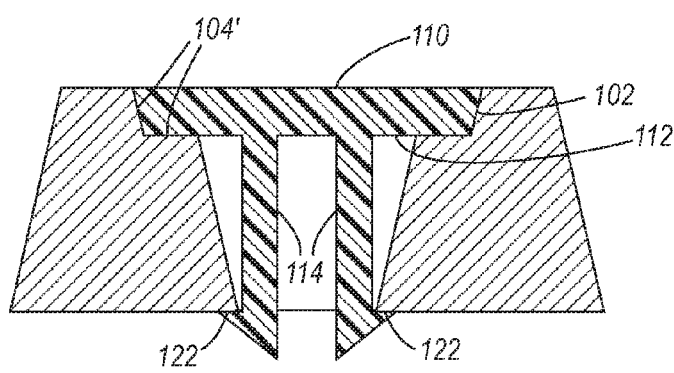
FIG. 5 is a sectional view, seen along line 5-5 of FIG. 1, now showing the completed installation.

The process of installing the snap-fit ornamental wheel insert 100' onto an automotive wheel 106 is sequentially depicted at FIGS. 3 through 5.

Figure 7:
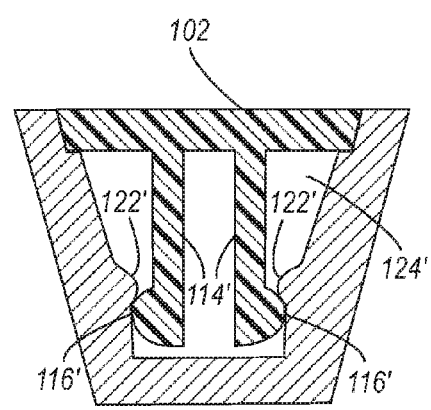
FIG. 7 is another alternative form of the first embodiment of the snap-fit ornamental insert, wherein the insert seat does not include an opening passing entirely through the wheel.
Figure 8:
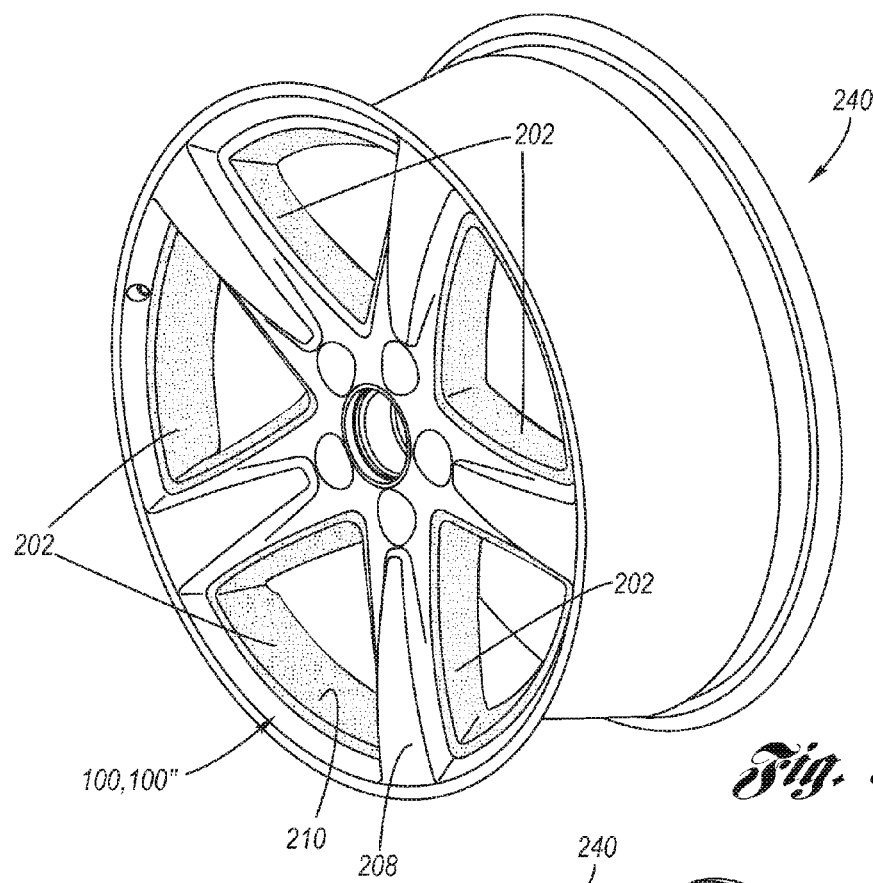
FIG. 8 is a perspective view of an automotive wheel including a plurality of snap-fit ornamental wheel inserts according to a second embodiment of the present invention.

As shown at FIG. 3, the snap fit ornamental wheel insert 100' is oriented in aligned and spaced relation to its intended insert seat 104 so that the inner side 112 of the insert body 102 faces toward the outside 108 of the wheel 106, whereby the fingers 114 pass into the insert seat 104. In the example shown, the insert seat includes a seat opening 124 which passes through the wheel from the outside 102 to the inside 118, and may or may not be tapering; however, as shown at FIG. 7, the seat opening 124' need not pass entirely through the wheel so long as the bosses 116' can snappingly grip a boss abutment 122' of the wheel (which are shown also rounded by way of example). The entry ramp 120 provides an acutely angled slope which allows the bosses to pass into the seat opening by sliding abutment with the seat opening walls 126.

As shown at FIG. 4, as the snap fingers 114 pass further into the seat opening 124, the bosses 116 press against the seat opening walls 126 so as to cause the fingers to be resiliently bent toward each other.

As shown at FIG. 5, the bosses 116 eventually clear the boss abutments 122, and the fingers thereupon resiliently snap back to, or at least closer to, their original, unbent shape, whereby the bosses 116 become interferingly engaged with the boss abutments. Simultaneously, the inner side 110 of the insert body 102 is seated at a fixed location with respect to its insert seat 104.

If desired, a user need only squeeze together the bosses 116 (as for example by use of a pliers) so that the bosses again clear the boss abutments 122 and the fingers 114 are thereupon enabled to pass back through the seat opening 124, and be separably removed from the wheel 106.

Figure 6:
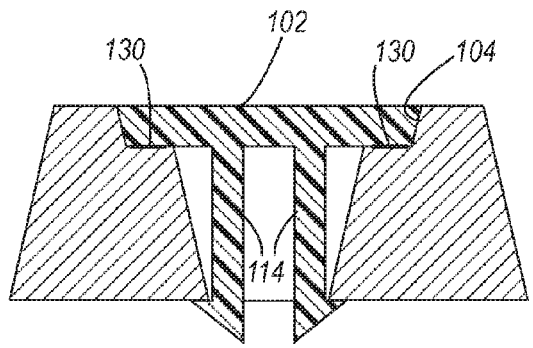
FIG. 6 is an alternative form of the first embodiment of the snap-fit ornamental wheel insert, wherein two-sided tape is utilized as a supplemental retention feature.

As shown at FIG. 6, two-sided tape 130, known in the prior art and for example available through 3M Company of St. Paul, Minn. 55144, may be used as a supplemental affixment as between the inner side of the insert body 102 and the seat surfaces of the insert seat 104 to supplement the primary affixment provided by the snap-fit of the bosses with respect to the boss abutments.

Turning attention now to FIGS. 8 through 14, depicted is a second preferred embodiment of the snap-fit ornamental wheel insert 100, 100" according to the present invention. Each snap-fit ornamental wheel insert 100" is composed of a multiple piece construction: an insert body 202 and a snap ring 204, which are configured to mutually snap together. The insert body 202 has a predetermined shape which is complementary to the shape of a corresponding insert seat 206 formed at the outside (class A finish side) 208 of the wheel 240 such that the insert body seats locatably and securely at the insert seat via abutment with the seat surfaces 206' (see FIGS. 9 and 11). As mentioned with respect to the first embodiment, the insert seat 206 may be configured specifically for receiving the insert body 202, or may be an artifact of the configuration of the wheel which is suitable in shape for locating a complementarily shaped insert body, as is shown by way of example at FIGS. 8 and 10), and may be disposed at a spoke, between spokes (preferred) or independent of any spokes (whether or not present). Each insert body 202 has an outer (class A finish) side 210 which is visible to an onlooker when it is seated in its respective insert seat 206, and has an inner (class A or class B finish) side 212 opposite the outer side, wherein the selection of a class A or a class B finish therefor depends on whether or not it is visible to an onlooker observing the outside of the wheel.

The insert body 202 carries a plurality of snap-fit engagement members 214 which are spaced around its inner side 212. The snap ring 204 has a class A or a class B finish depending upon whether it is visible to an onlooker of the outside of the wheel. The snap ring 204 is configured to provide a snapping interlock with respect to the snap-fit engagement members 214 of the insert body 202. In this regard, if the snap ring 204 has a simple ring shape, as for example as that shown at FIGS. 9, 11 and 12, then anywhere on the periphery 218 of the snap ring 204 can the snap-fit engagement members interlock therewith (see FIG. 12); however, the snap ring may have other than a simple ring shape, as for example shown at FIG. 14 where the snap ring 204' has a plurality of slots 222, wherein each slot snap-fit engages a respective engagement member 214' of the insert body 202', or may be otherwise shaped. When the snap ring 204, 204' and the insert body 202, 202' are pressed into each other, the snap-fit engagement members 214, 214' provide a retained snap-fit with respect to the snap ring. By way of example, the snap-fit engagement members 214, 214' may be in the form of a boss 220, 220', preferably barb or wedge-shaped, which is configured to snappingly engage onto the periphery 218 or onto the cross-member 222' of the slot 222 of the snap ring 204, 204', as the case may be, respectively.

The snap-fit interlock as between the insert body and the snap ring can be other than that described herein so long as a snap-fit occurs when they are pressed together. For example, either of the snap ring and the insert body can carry the snap-fit engagement members.

Figure 9:
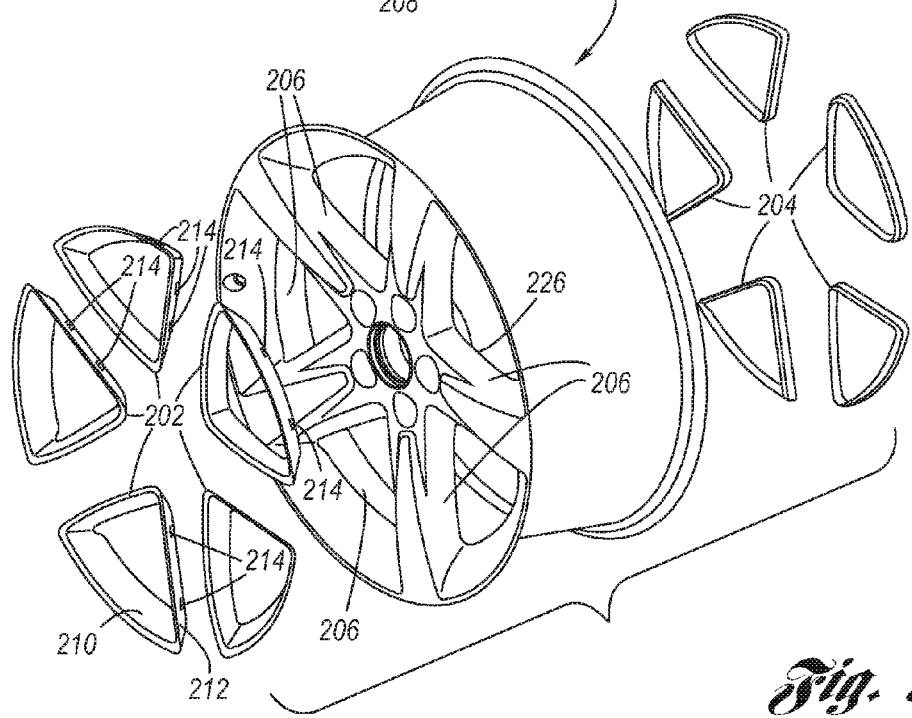
FIG. 9 is an exploded perspective view of the wheel of FIG. 6 including ornamental wheel inserts according to a second embodiment of the present invention, wherein the components thereof are arranged for installation on the wheel.
Figure 10:
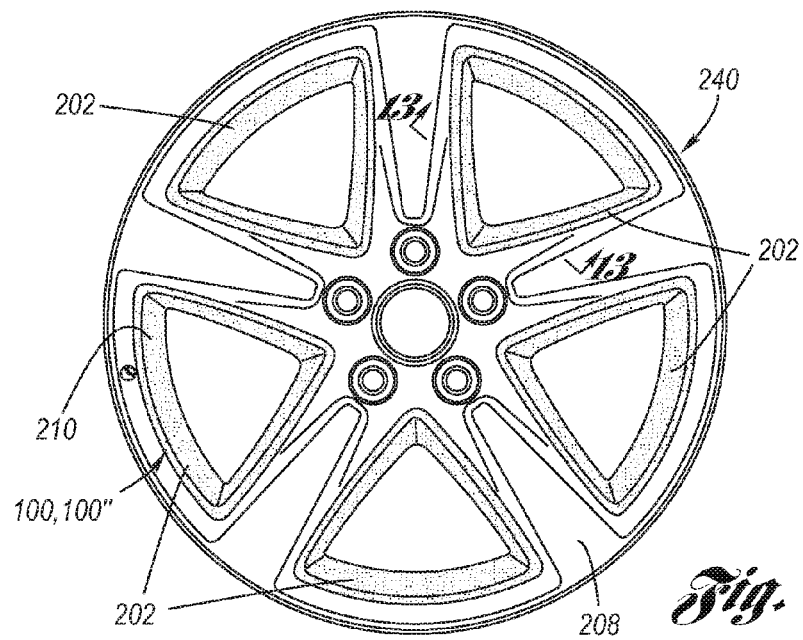
FIG. 10 is a front elevational view of the automotive wheel of FIG. 8.
Figure 11:
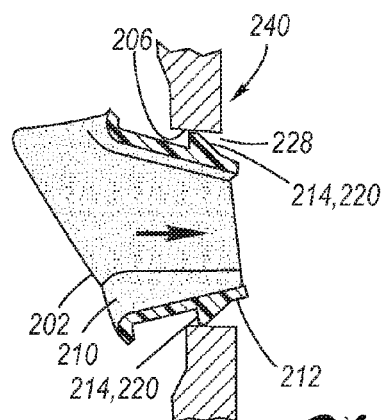
FIG. 11 is a sectional view of the insert seat of a wheel and the snap-fit ornamental wheel insert of FIGS. 8 and 10, shown at an initial stage of installation.
Figure 12:
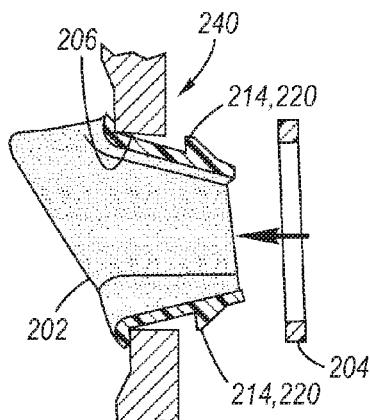
FIG. 12 is a sectional view of the insert seat of a wheel and the snap-fit ornamental wheel insert of FIGS. 8 and 10, shown at an intermediate stage of installation.
Figure 13:
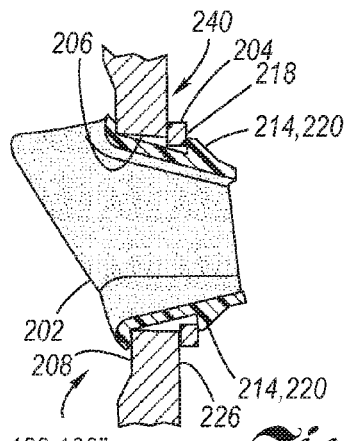
FIG. 13 is a sectional view, seen along line 13-13 of FIG. 10, now showing the completed installation.

The process of installing the snap-fit ornamental wheel insert 100" onto an automotive wheel 240 can be understood by simultaneous reference to FIGS. 11 through 13, as well as to FIG. 9.

As shown at FIG. 11, the insert body 202 of the snap fit ornamental wheel insert 100" is oriented in aligned and spaced relation to its intended insert seat 206 so that the inner side 212 of the insert body which carries the snap-fit engagement members 214 faces toward the outside 208 of the wheel 240 and it thereupon passed through the seat opening 228.

As shown at FIG. 12, each snap ring 204 of the snap fit ornamental wheel insert 100" is then oriented in aligned and spaced relation to its respective insert body 202 at the inside 226 of the wheel 240.

Next, the insert body is seated at its respective insert seat and the snap ring is moved toward the insert body, whereupon flexing of at least one of the insert body and the snap ring allow the first snap-ring engagement members 220 to snappingly engage the periphery 218 of the snap ring 204.

As shown at FIG. 13, the snap-fit engagement members interferingly retain the insert body 202 in seated location at its respective insert seat 206, wherein on the insert body is trapped at the outside 208 of the wheel and the snap ring 204 is trapped at the inside 226 of the wheel 240.

To selectively remove the snap-fit ornamental wheel insert 100" from the wheel 240, the snap-fit engagement members 214 are interferingly disengaged from the snap ring, as for example by utilizing a flat screw driver blade as a prying tool.

Figure 14:
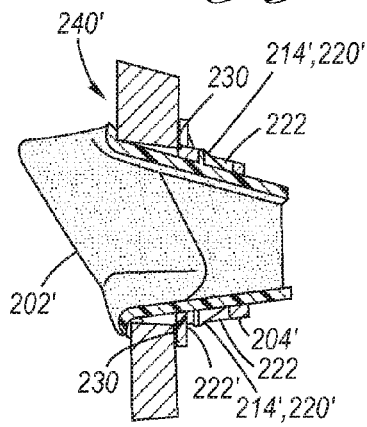
FIG. 14 is a sectional view similar to that of FIG. 13, wherein now an alternate ornamental wheel insert according to the second embodiment of the present invention is shown.

At FIG. 14, basically the same engagement/disengagement procedure is undertaken with respect to the wheel 240'. Now for engagement, the snap-fit engagement members 214' snap into the respective slots 222 of the snap ring 204' and be retained at the cross-member 222' thereof.

Merely by way of exemplification of its use with respect to the second embodiment of the present invention, prior art two-sided tape 230 may be used as a supplement to the snap-fit engagement which is the primary mode of attachment.

The ornamental wheel inserts 100 may be composed of, for example, acrylonitrile butadiene styrene (ABS)-polycarbonite (PC) alloy (for chrome or powder coated), carbon fiber (for painted or clearcoat), or nylon plus Pe66 (for painted), or other suitable materials.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An ornamental insert and wheel combination, comprising:
    a wheel having an outside and an oppositely disposed inside, said wheel having at least one insert seat; and
    an ornamental insert comprising:
        an insert body having an inner side configured to seat at said insert seat and be in an interferingly abutting relation to said outside of said wheel;
        a snap ring; and
        a plurality of snap-fit engagement members connected to at least one of said insert body and said snap ring;
    wherein said snap ring is configured to snappingly engage with respect to said insert body via said plurality of snap-fit engagement members; and
    wherein when said insert body is seated at said insert seat, said snap ring is disposed abuttingly at said inside of said wheel and snappingly engaged via said plurality of snap-fit engagement members to said insert body so as to trap said insert body at said outside of said wheel and trap said snap ring at said inside of said wheel and thereby affix said insert body to said insert seat.

2. The combination of claim 1, further comprising two-sided tape adhesively connecting said wheel to said insert body.

* * * * *